June 19, 1956 W. J. DARKENWALD 2,751,096
REAR DUMP WAGON
Filed May 21, 1954 3 Sheets-Sheet 1
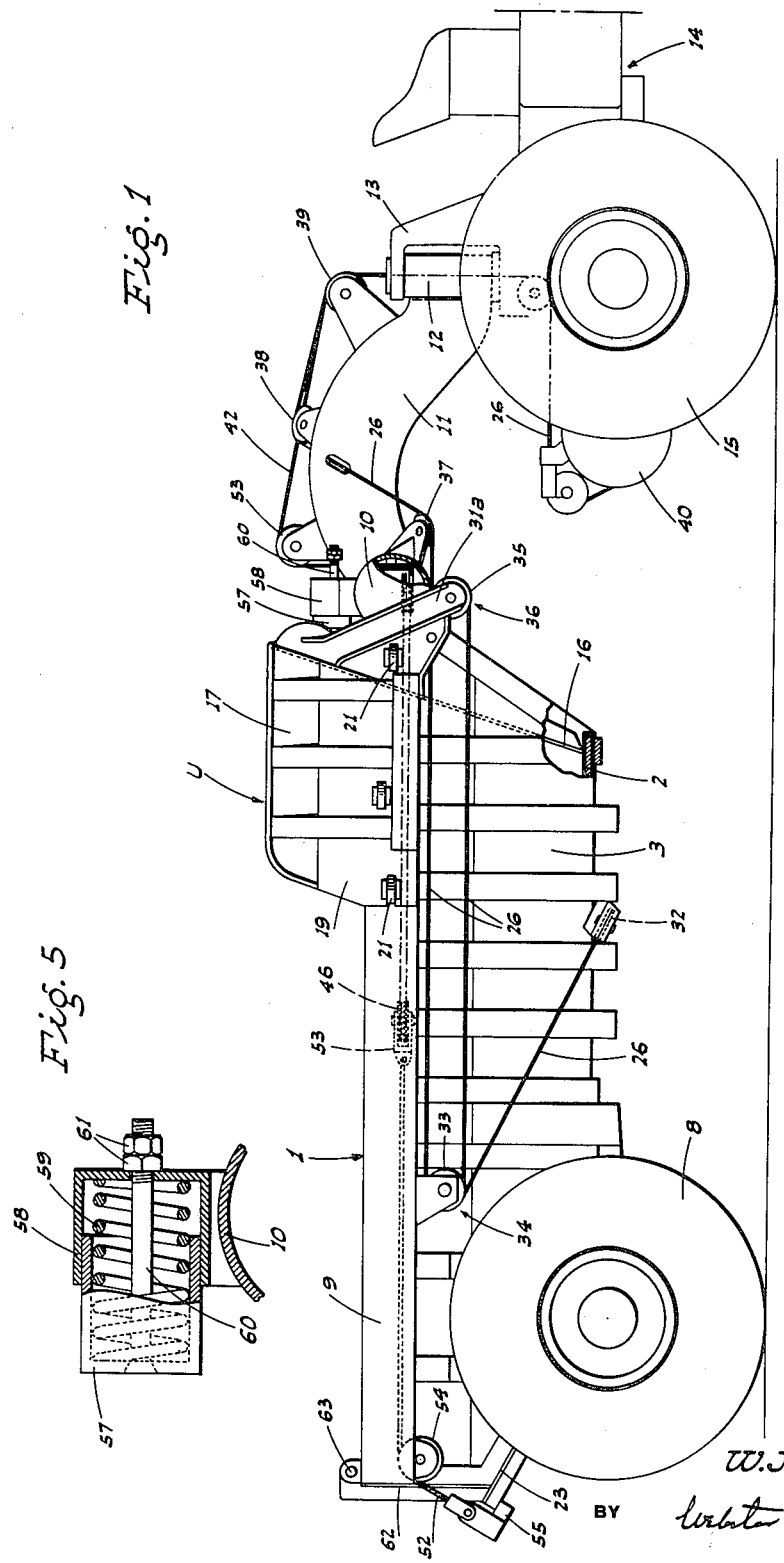
INVENTOR
W. J. Darkenwald
BY
ATTORNEYS

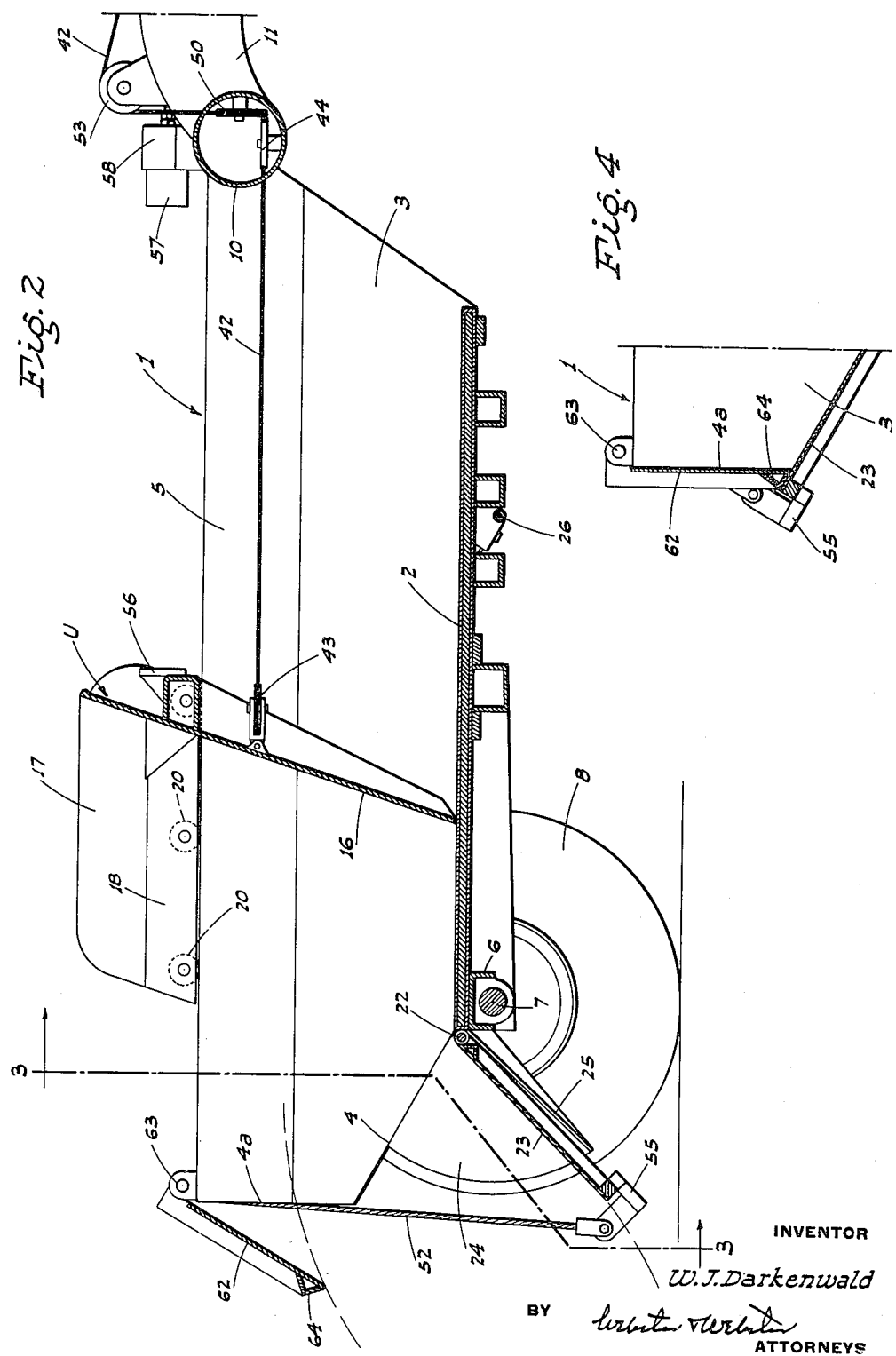

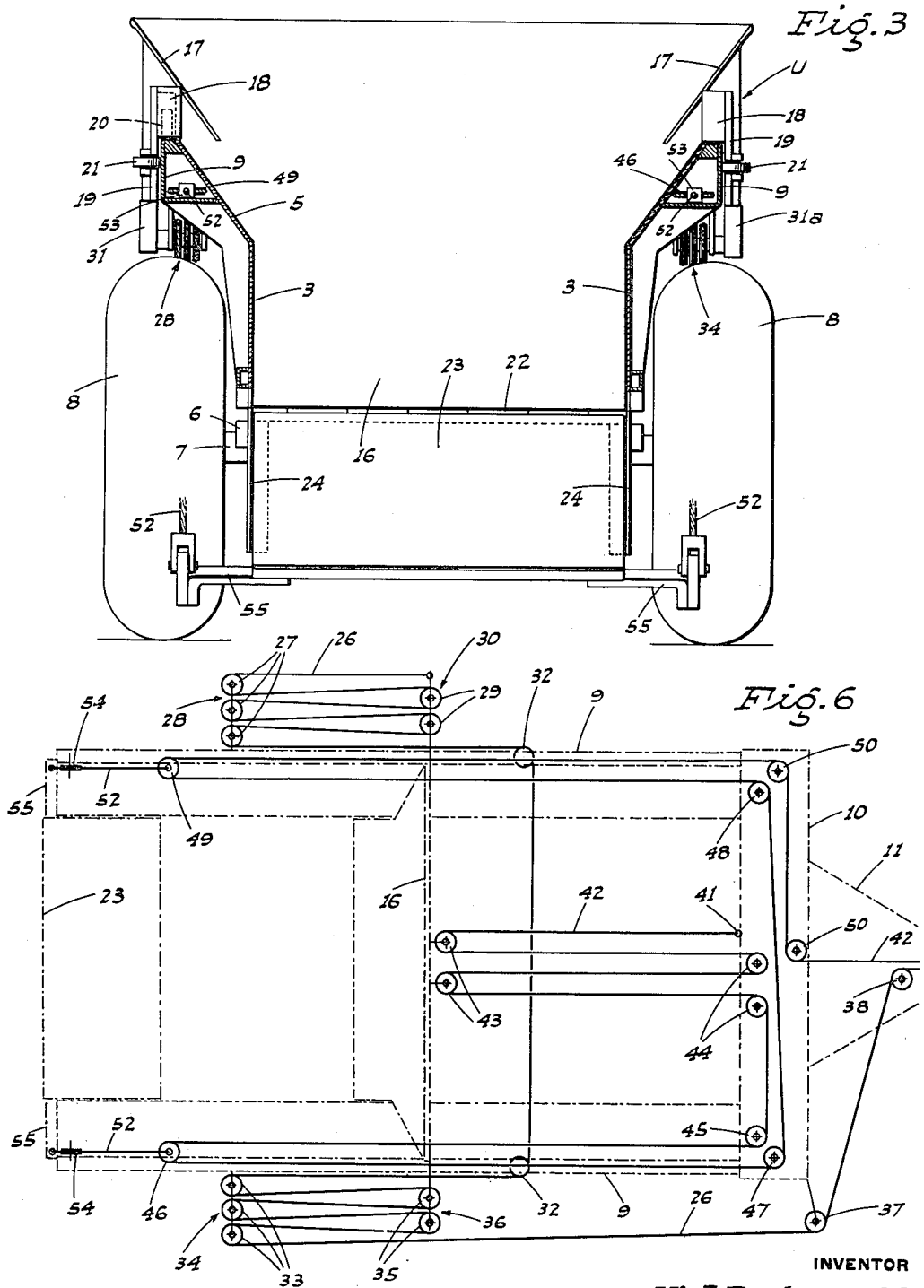

United States Patent Office 2,751,096
Patented June 19, 1956

2,751,096

REAR DUMP WAGON

Wilbert J. Darkenwald, Sacramento, Calif., assignor, by mesne assignments, to Yuba Manufacturing Company, Benicia, Calif., a corporation of California Application May 21, 1954, Serial No. 431,361

7 Claims. (Cl. 214—82)

This invention relates to heavy-duty rear-dumping dirt conveying wagons; one of the features of my improved wagon being the provision of a rearwardly movable push-out or ejector gate normally forming the front-end closure of the wagon, and a hinged and normally raised but downwardly swingable tailgate at the rear end of the wagon which is adapted to be lowered, to form a chute down which the dirt slides, when the ejector gate is pushed rearwardly.

In connection with the ejector gate and swingable tailgate, an important object of the invention is to provide a power actuated cable system for pushing the ejector gate rearwardly, another cable system for raising the tailgate to its closed position, and connecting means between the latter cable system and the ejector gate so that the latter will be retracted—or pulled forwardly—by actuation of said last named cable system, so that the ejector gate and tailgate will both be returned to their initial wagon-closing positions at the same time and without the need of springs, or any other added devices, to retract the ejector gate.

A further object is to provide a hopper arranged as a unit with the ejector gate, so that proper guiding of the dirt into the wagon from a power shovel or the like is facilitated.

Still another object is to enable the load to be discharged between the rear wheels of the wagon without such dirt contacting and getting under the wheels; the tailgate when lowered cooperating with fixed side members which confine the dirt, and form—with the gate—a dirt guiding chute.

A still further object of the invention is to provide a cushion or yieldable stop positioned for engagement and compression by the ejector gate when the latter is fully retracted so as to take the sudden strain and shock off the retracting cable, such as would be occasioned by the gate coming up against a rigid stop.

It is also an object of the invention to provide an additional upper gravity-closed tailgate which is opened by dirt etc. pressing against the same, and which cooperates with the lower cable-controlled tailgate so that it cannot be opened unless the lower tailgate is first opened.

An additional object of the invention is to provide a practical, reliable, and durable rear dump wagon, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the wagon, with parts broken and in section, showing the dirt confining gates in their retracted or closed positions.

Fig. 2 is an enlarged longitudinal section of the body of the wagon, showing the main tailgate lowered and the ejector gate advanced toward the rear somewhat.

Fig. 3 is a cross section of the wagon on line 3—3 of Fig. 2.

Fig. 4 is a fragmentary longitudinal section of the rear end portion of the bowl, showing the cooperative interlocking relationship of the two tailgates when closed.

Fig. 5 is an enlarged elevation, mainly in section, of one of the cushion bumper or stop units, in a fully advanced or non-compressed position.

Fig. 6 is a diagrammatic plan of the wagon, showing the gate controlling cable systems.

Referring now more particularly to the drawings and to the characters of reference marked thereon, the wagon body—indicated generally at 1—comprises a flat elongated bottom 2 having upstanding sidewalls 3 which extend rearwardly beyond the bottom 2 for some distance, and whose lower edges—beyond said bottom—extend at an upward acute angle, as shown particularly at 4 in Fig. 2. From an inception some distance from the bottom, the sidewalls 3 flare outwardly from end to end to the top, as shown at 5 in Fig. 3. At the rear end of and under the bottom 2, a cross beam 6 reinforces the same and supports the axle 7 of rear wheels 8, which are of course disposed outwardly of, but relatively close to, the sidewalls 3, as shown in Fig. 3.

Extending along the top of the sidewalls on the outside thereof are tubular, straight-sided reinforcing beams 9 which extend ahead of the forward end of bottom 2 some distance (as do the sidewalls 3), and are rigidly connected to a tubular cross beam 10. A central neck 11 extends forwardly from the beam 10, and at its forward end has a vertical tubular post 12 which has swivel connection on a vertical axis with, and is supported by, an upstanding yoke 13 on a tractor 14 (see Fig. 1). The yoke is disposed between the rear wheels 15 of the tractor, and the neck 11 is arranged so that one or the other of said wheels can swing under the neck without interference, so that the tractor may make a 90° turn relative to the wagon, if desired.

Movably fitting between, and following the contour of, the sidewalls 3, and extending from bottom 2 to a point some distance above the same as shown in Figs. 2 and 3, is an ejector gate 16 disposed with a downward slope to the rear. Extending rearwardly from the upper edge of the gate some distance are outwardly flaring side plates 17 secured on side beams 18 overhanging beams 9; side plates 19 secured to beams 18 depending from the same on the outside of beams 9.

A plurality of horizontal axis rollers 20 and vertical axis rollers 21, engaging the top and outer side of beams 9 and mounted in beams 18 and plates 19, respectively, support the combined hopper and ejector gate unit U thus formed for guided and relatively frictionless movement along the beams 9.

Hinged at its forward end on the wagon at the rear end of, and level with, the bottom 2—as at 22—is a tailgate 23 arranged when closed to engage against the upwardly sloping edge 4 of the sidewalls 3, and normally held thereagainst by a cable system, described later. Said tailgate is thus disposed between the rear wheels 8, and the side gaps between the lower edge of the side walls and the tailgate—when the latter is lowered—are closed by side skirts or shield plates 24. These skirts are disposed close to the side edges of said tailgate, as shown in Fig. 3; and so—with the tailgate—form a chute down which the dirt may slide onto the ground for the desired controlled and confined distribution of such dirt, without any dirt falling between the side edges of the tailgate and the wheels 8. The tailgate, when fully lowered to an angle of approximately 45°, then bears against ledges 25 projecting inwardly from the lower edge of the side skirts 24.

In order to forcefully move the ejector gate and hopper unit rearwardly, the following cable system is provided, as shown diagrammatically in Fig. 6.

A cable 26 is anchored at one end on one beam 9 and extends first rearwardly and then reeves back and forth between the sheaves 27 of a multiple sheave block 28 secured on the under side of said beam intermediate the rear end thereof, and cooperatively alined sheaves 29 forming a sheave block 30 which is mounted on an arm 31 rigid with, and depending from, the hopper and gate unit U at the forward end thereof and laterally out from the adjacent beam 9. The block 28 is disposed so as to always be rearwardly of the block 30 with any position of the unit U.

Upon finally leaving sheave block 28 the cable 26 extends downwardly and forwardly and passes across and under the bottom of the wagon, passing about guide sheaves 32 mounted on the wagon body at the sides and bottom thereof. The cable then extends rearward and is reeved back and forth between the sheaves 33 of a sheave block 34 corresponding to sheave block 28, and the sheaves 35 of a block 36 mounted on the corresponding arm 31a of the unit U. From the sheave block 36 cable 26 extends forwardly to and about guide sheaves 37, 38, and 39 mounted on the beam 10 and the neck 11; the sheave 39 disposing the cable so that it may pass down through the tubular member 12 and thence to one drum of a double-drum power control unit 40 on the tractor 14, as indicated in Fig. 1.

It will therefore be seen that actuation of unit 40 to pull the cable will cause the gate and hopper unit U to be forcefully moved to the rear, pushing the dirt in the wagon from the rear end thereof.

To control the raising and lowering of the tailgate, and also to pull the ejector gate unit U forwardly, the following cable system is provided.

Anchored at one end on beam 10, as at 41, is a cable 42 which extends thence first rearwardly to, and is reeved back and forth between, a pair of sheaves 43 secured on the adjacent or back side of ejector gate 16 substantially centrally of its width, and a pair of guide sheaves 44 in beam 10. From the final sheave 44 the cable extends along said beam to adjacent one end thereof or at the corresponding side of the wagon, and passes from said beam in a rearward direction about a guide sheave 45 in the beam 10. From sheave 45 the cable 42 extends rearwardly in the adjacent side beam 9 to and about a floating sheave 46 within said beam 9. Leaving said sheave 46 the cable extends forwardly into the cross beam 10 and thence to the opposite end thereof, being guided by sheaves 47 and 48 in said beam 10. Leaving sheave 48 the cable 42 extends rearwardly within the corresponding side beam 9 to and about a floating sheave 49 corresponding to sheave 46. From sheave 49 the cable extends forwardly to the cross beam 10 and along inside the same to the neck 11, being guided within the beam 10 by suitably disposed sheaves 50 therein. The cable 42 leaves the beam 10 over the neck and extends thence over suitable guide sheaves, such as 51 in Fig. 1, to a connection with another drum of the power control unit 40, in the same manner as the first described cable 26 is guided thereto. Single heavy cables 52 are connected to the mounting yokes 53 of said floating sheaves 46 and 49, respectively, and are directed downwardly over guide sheaves 54 at the ends of the side beams 9 to connection with arms 55 projecting laterally from the tailgate 23 at the rear end thereof.

By reason of the above described cable arrangement, in connection with the first described cable 26, it will be seen that when said cable is pulled to move the ejector gate to the rear, the cable 42 is allowed to run slack to enable the tailgate 23 to drop freely by reason of its own weight and that of the dirt thereon, and so allowing of an unobstructed discharge of dirt from the wagon. When the wagon has been emptied and it is desired to return the tailgate and the ejector gate to their initial load-receiving positions in the wagon body, it will be seen that a pull on cable 42 will first effect raising of the tailgate to its closed or sidewall engaging position, and the ejector gate and hopper unit will then be pulled forward by said cable to its initial position at the front end of the wagon body.

When the ejector gate has about reached its forward limit of movement, transversely spaced, upstanding stop plates 56—secured on the back of the ejector gate (see Fig. 2)—each engages a plunger 57 slidable in a cylinder 58 secured on the beam 10 in rearwardly facing relation. Continued forward or retracting movement of the ejector gate causes a spring 59 in each cylinder and engaging the initially advanced plunger, to be compressed. This provides the desired cushion action and avoids the shock on the cable and connected parts which would be occasioned by a sudden bringing up of the gate against a rigid stop.

The extent of rearward movement of the plunger from its cylinder is limited by a central rod 60 secured to the rear outer end of the plunger and slidable through the front end of the cylinder, as shown in Fig. 5. Adjustable nuts 61 on the rod engage the front end of the cylinder outside the same when the plunger is fully projected rearwardly.

For certain conditions or kinds of dirt, it may be desirable to close the back of the wagon to a greater depth than is afforded by the tailgate 23. This may be done by an auxiliary upper tailgate 62 hinged at its upper end on the beams 9 at the top and rear end thereof, as at 63, and adapted to close by gravity and to be opened by the pressure of dirt thereagainst. When gate 62 is closed, it engages the rear vertical edges 4a of side walls 3 above the sloping edges 4. A cross beam 64 on the lower end of said gate 62 is then overlapped and engaged by the gate 23 when the latter is closed, as shown in Fig. 6, in such a manner that pressure against gate 62 will not open the same, and said gate cannot be opened until the main tailgate 23 is lowered.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a rear dump wagon which comprises a wagon body having a longitudinally flat bottom and upstanding side walls, the combination with an ejector gate normally closing the front end of the body and fitted between the side walls, and means to move the gate rearwardly to push the dirt in the body toward the rear; of a tailgate normally closing the rear end of the body, means hinging the tailgate at its normally lower end on the rear end of the body for downward swinging movement from a closed position, and control means separate from the gate moving means normally preventing opening of the tailgate.

2. A rear dump wagon comprising a wagon body having a longitudinally flat bottom and upstanding side walls, an ejector gate normally closing the front end of the body and fitted between the side walls, means to move the gate rearwardly to push the dirt in the body toward the rear, a tailgate normally closing the rear end of the body, means hinging the tailgate at its normally lower end on the rear end of the body for downward swinging movement from a closed position, means including a cable operable from ahead of the wagon to close the tailgate, and means reeving said cable intermediate its ends in connection with the ejector gate to pull the same forwardly after the tailgate is closed.

3. A rear dump wagon comprising a wagon body having a longitudinally flat bottom and upstanding side walls, an ejector gate normally closing the front end of the body and fitted between the side walls, means to move the gate rearwardly to push the dirt in the body toward the rear, a tailgate normally closing the rear end of the body, means hinging the tailgate at its normally lower end on the rear end of the body for downward swinging movement from a closed position, forwardly extending cables connected to and upstanding from the tailgate at the sides, floating sheaves to which the cables are connected, and a pull cable extending from an anchor point on the wagon ahead of the ejector gate rearwardly to and about a sheave on the forward side of said gate, then forwardly to and about transversely spaced guide sheaves fixed on the wagon ahead of the gate, then rearwardly about one of the floating sheaves, then forwardly to and about other transversely spaced guide sheaves fixed on the wagon ahead of the ejector gate, then rearwardly to and about the other floating sheave, and then forwardly for connection to a power actuated drum.

4. A rear dump wagon, as in claim 3, with tubular side beams extending along the sides of the wagon in which the floating sheaves and the adjacent portions of the cable are enclosed, and a tubular cross beam at the forward end of said side beams in which the guide sheaves are mounted and in which the adjacent portions of the cable are enclosed.

5. In a rear dump wagon, a body which includes a bottom and upstanding side walls, an ejector gate mounted between the side walls for reciprocating movement from a predetermined forward position adjacent the front end of the body to a position adjacent the rear end thereof, the ejector gate extending above the side walls some distance, and hopper forming means including side plates rigid with the gate above and flaring outwardly to overlie the top edges of the side walls and extending rearwardly from the gate a predetermined distance.

6. In a rear dump wagon, a body which includes a bottom and upstanding side walls, an ejector gate mounted between the side walls for reciprocating movement from a predetermined forward position adjacent the front end of the body to a position adjacent the rear end thereof, the ejector gate extending above the side walls some distance, longitudinal side beams extending along the upper edge of the side walls, relatively short beams rigid with the upwardly projecting portion of the gate guidably supported on said side beams for movement along the same and projecting rearwardly from the gate, and side plates projecting upwardly and flaring outwardly from the inner side edges of said short beams and extending to connection with said upwardly projecting portion of the gate.

7. A rear dump wagon, as in claim 2, in which the cable is arranged to run slack upon rearward movement of the ejector gate whereby the tailgate is free to open by the pressure of the load in the body imparted to such load by rearward movement of the ejector gate.

References Cited in the file of this patent

UNITED STATES PATENTS

| | | |
|---|---|---|
| 285,848 | Seibert | Oct. 2, 1883 |
| 1,050,541 | Howland | Jan. 14, 1913 |
| 1,881,743 | Lillard | Oct. 11, 1932 |
| 1,961,587 | Hulley et al. | June 5, 1934 |
| 2,020,451 | Atwell | Nov. 12, 1935 |
| 2,047,602 | Tomlinson | July 14, 1936 |
| 2,394,006 | Osgood | Feb. 5, 1946 |
| 2,394,153 | Correa | Feb. 5, 1946 |
| 2,495,138 | Royle | Jan. 17, 1950 |
| 2,495,358 | Wengert | Jan. 24, 1950 |
| 2,523,916 | Paiement | Sept. 26, 1950 |
| 2,606,677 | Snedeger | Aug. 12, 1952 |
| 2,630,928 | McCombs | Mar. 10, 1953 |